(12) United States Patent
Alfano et al.

(10) Patent No.: US 12,523,980 B2
(45) Date of Patent: Jan. 13, 2026

(54) AUTOMATION AND MOTION CONTROL SYSTEM

(71) Applicant: TAIT TOWERS MANUFACTURING, LLC, Lititz, PA (US)

(72) Inventors: David Alexander Alfano, Lancaster, PA (US); Paul M. Sapsis, Philadelphia, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 140 days.

(21) Appl. No.: 18/487,720

(22) Filed: Oct. 16, 2023

(65) Prior Publication Data
US 2025/0123612 A1   Apr. 17, 2025

(51) Int. Cl.
G05B 19/31    (2006.01)
G05B 19/4063  (2006.01)
G05B 19/416   (2006.01)

(52) U.S. Cl.
CPC ......... G05B 19/31 (2013.01); G05B 19/4063 (2013.01); G05B 19/416 (2013.01)

(58) Field of Classification Search
CPC ... G05B 19/31; G05B 19/4063; G05B 19/416
(Continued)

(56) References Cited

U.S. PATENT DOCUMENTS 5,923,132 A * 7/1999 Boyer .............. G05B 19/40931
                                          318/567
6,600,289 B2 * 7/2003 George ................... B66D 3/18
                                          254/270
(Continued)

FOREIGN PATENT DOCUMENTS

EP         3865257 A1     8/2021
WO      2005084339 A2     9/2005

OTHER PUBLICATIONS

Sebastian Slominski et al., "Intelligent Object Shape and Position Identification for Needs of Dynamic Luminance Shaping in Object Floodlighting and Projection Mapping", Energies 2020, 13, 6442; 21 pages, Dec. 5, 2020, http://www.mdpi.com/journal/energies.
(Continued)

*Primary Examiner* — David Luo
(74) *Attorney, Agent, or Firm* — Saxton & Stump, LLC

(57) ABSTRACT

An automation and motion control system and method to control a plurality of theatrical objects. The control system includes a plurality of nodes and an operator console node in communication with each other over a real time network. The node corresponds to a device for control of a theatrical object. Each node of the plurality of nodes and the operator console node include a microprocessor and a memory device. The operator console node further includes a stored control path submodule, a manual control submodule and a reactive control submodule. Each of the stored control path submodule, the manual control submodule and the reactive control submodule generate an independent control signal. An active control submodule generates a summed control signal in response to the independent control signals from the stored control path submodule, the manual control submodule and the reactive control submodule. The summed control signal is provided to a node process, providing control to at least one device.

22 Claims, 12 Drawing Sheets

(58) Field of Classification Search
USPC .................. 318/574, 570, 569, 567, 560
See application file for complete search history.

(56) References Cited

U.S. PATENT DOCUMENTS

| | | | |
|---|---|---|---|
| 9,055,226 | B2 | 6/2015 | Densham et al. |
| 9,429,926 | B2 * | 8/2016 | Love .................. H04L 67/10 |
| 11,546,982 | B2 | 1/2023 | Jordan et al. |
| 2020/0167733 | A1 | 5/2020 | Nehru |
| 2021/0042019 | A1 | 2/2021 | Densham et al. |
| 2022/0360718 | A1 | 11/2022 | Choffat et al. |

OTHER PUBLICATIONS

Michael R. Marner, et al., "Exploring Interactivity and Augmented Reality in Theater: A Case Study of Half Real", 6 pgs, Mar. 21, 2013.

Labayen, et al., "Depth Map Based Object Tracking and 3D Positioning for Non-Static Camera", 5 pgs., Feb. 2013, https://www.vicomtech.org/upload/download/publicaciones/b339c9b58c86575d540b355356aabc0a.pdf. Publication data via, https://www.researchgate.net/publication/266632349_Depth_Map_based_Object_Tracking_and_3D_Positioning_for_Non-Static_Camera.

* cited by examiner

AUTOMATION AND MOTION CONTROL SYSTEM

FIELD OF THE INVENTION

The present disclosure is generally directed to methods and systems relating to control systems, particularly for entertainment automation systems.

BACKGROUND OF THE INVENTION

To provide a realistic atmosphere for a theatrical production, theatrical objects or components can be moved or controlled by an automation and motion control system during (and between) scenes on a stage or takes on a motion picture production set. Over the course of a standard large scale live event, a significant amount of effort is expended to point various fixtures at targets on stage. From lighting fixtures to cameras, keeping a fixture pointed at a target, to this day, remains a largely manual task either carried out through preprograming or by a dedicated operator. Automation of the movement and control of the theatrical objects or components is desirable for safety, predictability, efficiency, and economics. Prior theatrical object movement and control systems provided for the control and movement of the theatrical objects or components under the control of a central computer or microprocessor. The prior movement and control systems controlled a large number of devices using lists of sequential actions or instructions that were executed by the central computer. The control scheme provided by the central computer only utilizes a single type of control. For example, when automating motion control, the central computer generally only provides a single type of control, such as control from a pre-determined/pre-programmed motion path or manual control. Alternatively, the motion can be automatically controlled in view of sensors or control conditions. For example, control of a camera may be controlled in this manner. However, current systems do not provide an ability to switch between control schemes in real time, such as during a live show.

Technology providers such as a BlackTrax™ system (available from CAST Group of Companies Inc., Toronto, Canada) have emerged to provide real time localization and coordinates of moving targets for live events and, systems such as the LightStrike™ (available from Kinesys Projects Ltd, a TAIT Company, Hampton, UK) have emerged providing the algorithms need to automatically point a lighting fixture at a moving target on stage. To date, these known systems have several major drawbacks, including, but not limited to the following:

- Known systems exclusively listen to one immutable value source for targeting;
- Known systems are piecemeal and require multiple pieces of hardware/software and complex systems integrations to implement;
- Known systems primarily deal with a moving target assuming a stationary fixture;
- Known tracking algorithms do not support infinite rotational axes;
- Mechanisms for dealing with and transitioning between multiple static targets is absent;
- Advanced predictive tracking capabilities allowing for high speed or highly unstable stable systems are not present;
- Absolute positioning control of the payload is handed off to a tertiary system; and
- Cueing/playback capabilities are not supported.

What is needed is an automation and motion control system to visualize theatrical objects and the motion of theatrical objects in automation controls systems without manual configuration better tailored to live events production needs that does not suffer from the drawbacks of the prior art. Other features and advantages will be made apparent from the present specification. The teachings disclosed extend to those embodiments that fall within the scope of the claims, regardless of whether they accomplish one or more of the aforementioned needs.

SUMMARY OF THE INVENTION

The application generally relates to an automation and motion control system. The application relates more specifically to an automation and motion control system for the entertainment industry that uses a distributed control model and independent nodes. The automation and motion control system allows real time control of devices summed from a stored control path submodule, a manual control submodule or a reactive control submodule to provide control to at least one device.

One embodiment of the present disclosure is directed to an automation and motion control system to control a plurality of theatrical objects. The control system includes a plurality of nodes and an operator console node in communication with each other over a real time network. The node corresponds to a device for control of a theatrical object. Each node of the plurality of nodes and the operator console node include a microprocessor and a memory device. The operator console node further includes a stored control path submodule, a manual control submodule and a reactive control submodule. Each of the stored control path submodule, the manual control submodule and the reactive control submodule generate an independent control signal. An active control submodule generates a summed control signal in response to the independent control signals from the stored control path submodule, the manual control submodule and the reactive control submodule. The summed control signal is provided to a node process, providing control to the at least one device.

Another embodiment of the present disclosure includes a method to control a plurality of theatrical objects. A plurality of nodes and an operator console node are provided in communication with each other over a real time network. Each node of the plurality of nodes corresponds to at least one device for control of a theatrical object. Each node of the plurality of nodes and the operator console node includes a microprocessor and a memory device. The operator console node further includes a stored control path submodule, a manual control submodule and a reactive control submodule. Independent control signals are generated with each of the stored control path submodule, the manual control submodule and the reactive control submodule. A summed control signal is generated in response to the independent control signals from the stored control path submodule, the manual control submodule and the reactive control submodule. The summed control signal is provided to a node process. At least one device is controlled with the summed control signal.

Other features and advantages of the present invention will be apparent from the following more detailed description of the preferred embodiment, taken in conjunction with the accompanying drawings which illustrate, by way of example, the principles of the invention.

BRIEF DESCRIPTION OF DRAWINGS

Wherever possible, the same reference numbers will be used throughout the drawings to represent the same parts.

DETAILED DESCRIPTION OF THE INVENTION

Figure 1:
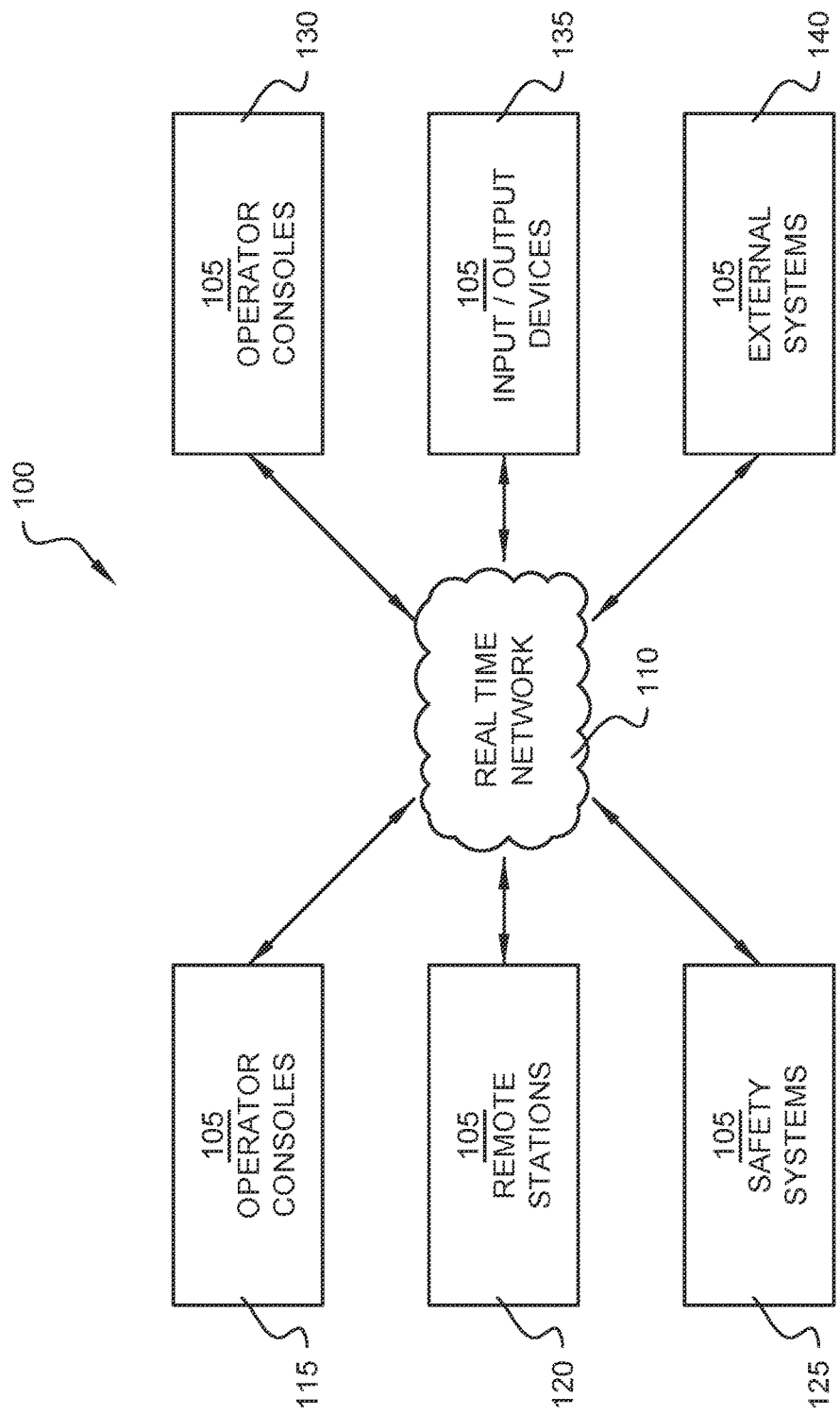
FIG. 1 schematically shows an embodiment of an automation and motion control system.

The system and method according to the present disclosure includes a real time "point at" computation system built to handle complex triangulation calculations with mechanisms to add a variety of control offsets in real time. The system according to the present disclosure may control any theatrical object with one or more controllable axes. Some example theatrical objects include, but are not limited to, cameras, lighting fixtures, fountains, cryogenic effects, and pyrotechnic effects. These theatrical objects may be stationary or affixed to another mechanism capable of moving the payload in 3D space. In one embodiment, the theatrical object may be suspended from a multi-line catenary support member, affixed to a vertical lift, affixed to a multi-axis robotic arm, affixed to a multi-axis dolly system, or some other dynamic 3D position system. The system and method according to the present disclosure includes a robust cueing, playback, and real time control engine capable of controlling, for example, the 3D positioning system. This engine calculates the real time coordinates of the payload (i.e., theatrical object) based on the geometry of the 3D positioning system and the system's encoded real-world position. The system and method according to the present disclosure provides operators the ability to offset the calculated payload coordinates to account for potential incomplete physics modeling (e.g., payload tilt due to inertial forces, payload tilt at extents of system travel). The system according to the present disclosure may also include predictive modeling techniques to better approximate real-world coordinates in instances where real-world positioning systems are known to have reduced accuracy. Additionally or alternatively, the system may have a mechanism whereby multiple real world positioning inputs may be processes simultaneously and averaged together using a confidence calculation/rating to better approximate on objects true real world position.

In one embodiment of the system and method according to the present disclosure utilizes a digital twin of the real-world space in which the payload exists to provide automated control. This digital twin is aligned to the physical space via the use of standard surveying techniques to map real-world reference points which correspond to the digital space—the system generally implements a Euclidean coordinate system. In this manner, operators effectively establish a shared coordinates system between real and simulated spaces. This shared coordinates space and calibration process allows the 3D positioning engine to calculate the real-world coordinates of the device or theatrical object to a high degree of accuracy to permit automated control.

Operators of the system and method according to the present disclosure supply the system with the real-world coordinates of desired targets using this shared coordinate space. The system and method according to the present disclosure provides several potential mechanisms (e.g., sensors) to input target coordinates into the system for use in the control schemes, including but not limited to:

One or more tertiary real time positioning system (e.g., BlackTrax, Follow-Me, ZacTrack, GPS/GNSS, Bluetooth Beacons, LIDAR, RFID, Time of Flight Sensors, Optical sensors etc.) provides moving target coordinates;

The tracked target is another element being controlled by the system's 3D positioning system and tracking data is being ingested directly from the engine into the system;

Motion profiles are preplanned (e.g., a performer walks a predetermined path over a set amount of time, vehicle motion is played back on a set interval by a tertiary motion control system, etc.) and expected target coordinates are streamed to the system through its integrated playback engine;

The operator manually updates the target position in the digital twin via an encodable input mechanism (i.e., dragging the target position in the digital twin to match the real-world position on a computer, touchscreen, or some other encodable surface);

Relative target heading is provided to the system to update absolute positional coordinates (e.g., a machine vision system provides relative target heading within the vision system's frame);

Static coordinates/presets are entered into the system and recalled manually or programmatically; and Targets positions are determined via a mathematically function with user defined constants (i.e., an effects engine).

FIG. 1 shows an exemplary embodiment of the automation and motion control system 100 according to the present disclosure. The automation and control system 100 can include a real time network 110 interconnecting devices 105 including operator consoles 115, remote stations 120, safety systems 125, machinery 130, input/output devices 135 and external systems 140. In one exemplary embodiment, safety systems 125 can include emergency stop (e-stop) systems; machinery 130 can include lifts, chain hoists, winches, elevators, carousels, turntables, hydraulic systems, pneumatic systems, multi-axis systems, linear motion systems (e.g., deck tracks and line sets), audio devices, lighting devices, and/or video devices; input/output devices 135 can include incremental encoders, absolute encoders, variable voltage feedback devices, resistance feedback devices, tachometers and/or load cells; and external systems 140 can include show control systems, industrial protocols and third party software interfaces including 0-10 V (volt) systems, Modbus systems, Profibus systems, ArtNet systems, BMS (Building Management System) systems, EtherCat systems, DMX systems, SMPTE (Society of Motion Picture and Television Engineers) systems, VITC systems, MIDI (Musical Instrument Digital Interface) systems, MANET (Mobile Ad hoc NETwork) systems, K-Bus systems, Serial systems (including RS 485 and RS 232), Ethernet systems, TCP/IP (Transmission Control Protocol/Internet Protocol) systems, UDP (User Datagram Protocol) systems, ControlNet systems, DeviceNet systems, RS 232 systems, RS 45 systems, CAN bus (Controller Area Network bus) systems, Maya systems, Lightwave systems, Catalyst systems, 3ds Max, 3D Studio Max systems, Unreal Engine, Audinate Dante, or Disguise Media servers and/or a custom designed system.

Figure 2:
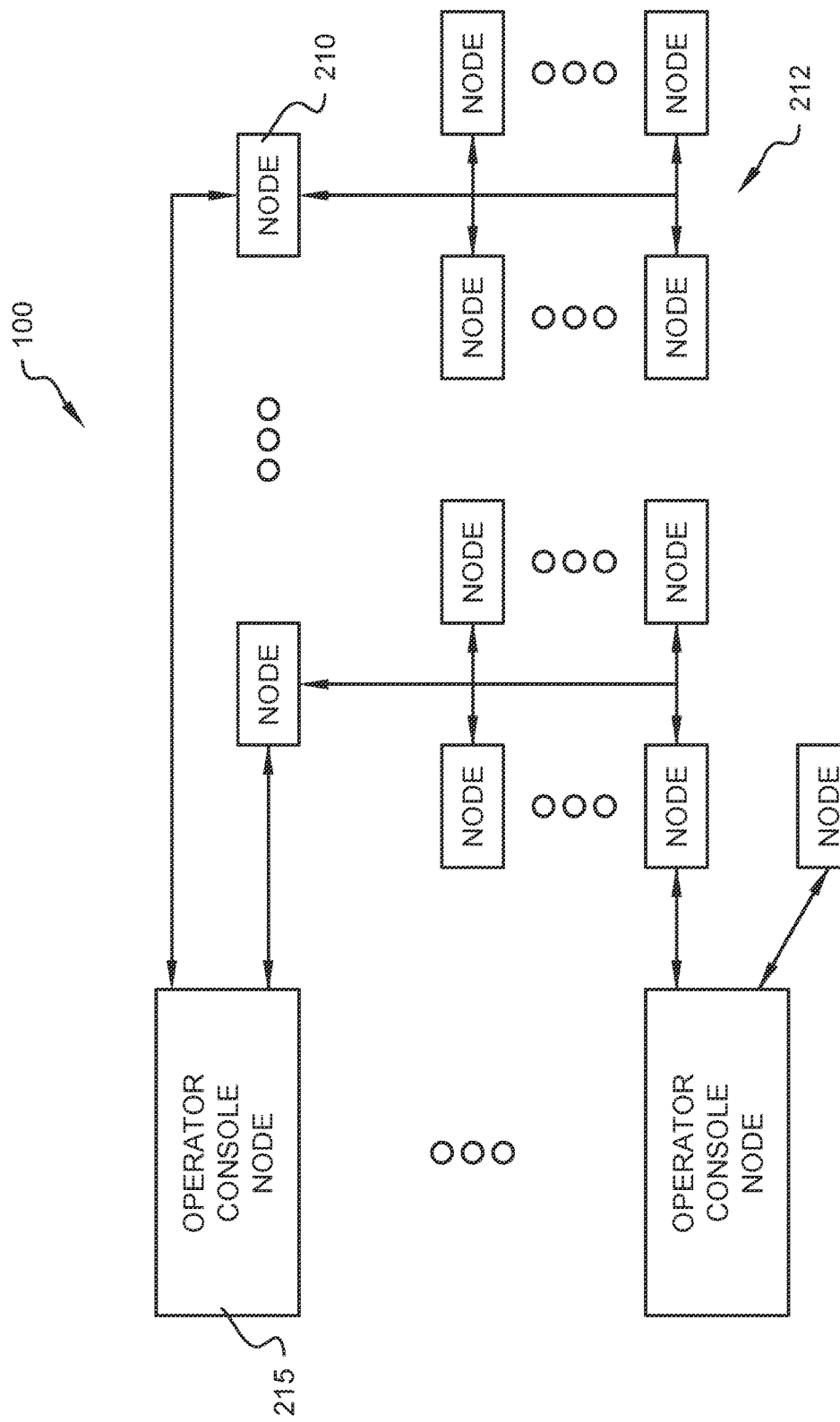
FIG. 2 schematically shows an alternate embodiment of an automation and motion control system.

FIG. 2 shows an embodiment of the automation and motion control system according to the present disclosure. The automation and motion control system 100 shown in FIG. 2 can be formed from the interconnection of nodes 210. Each node 210 may correspond to a specific device 105 (or group of devices 105) from remote stations 120, safety systems 125, machinery 130, input/output devices 135 and external systems 140. By "correspond to", "corresponding to", and grammatical variations thereof, it is meant that the node 210 includes a microprocessor and associated software/firmware that controls or otherwise interacts with the device 105 in a manner that provides control or information exchange. Devices 105 for use with the automation and control system according to the present disclosure may, for example, correspond to one or more of a winch, a lift, a motor, a pneumatic/hydraulic cylinder, a linear actuator, a trolley, a dolly, a cane, a jib, a boom, and a gimbal. An operator console node 215 can be a specific device 105 from operator consoles 115 and can enable an operator to interact with the control system 100, i.e., to send data and instructions to the control system 100 and to receive data and information from the control system 100. The operator console node 215 is similar to the other nodes 210 except that the operator console node 215 can include a graphical user interface (GUI) or human-machine interface (HMI) to enable the operator to interact with the control system 100. In one exemplary embodiment, the operator console node 215 can be a Windows® or other known computer suitable for motion control. In certain embodiments of the present disclosure, the operator console node 215 includes a display that provides a visual representation of the devices and their control features, through the graphical user interface (GUI) or human-machine interface (HMI).

In one exemplary embodiment, the operator(s) can make inputs into the system at operator console nodes 215 using one or more input devices, e.g., a pointing device such as a mouse, a keyboard, a panel of buttons, or other similar devices. As shown in FIG. 2, nodes 210 and operator console nodes 215 are interconnected with each other. Thus, any node 210, 215 can communicate, i.e., send and receive data and/or instructions, with any other node 210, 215 in the control system 100. In one exemplary embodiment, a group of nodes 210 can be arranged or configured into a network 212 that interconnects the nodes 210 in the group and provides a reduced number of connections with the other nodes 210, 215. In another exemplary embodiment, nodes 210, 215 and/or node networks 212 can be interconnected in a star, daisy chain, ring, mesh, daisy chain loop, token ring, or token star arrangement or in combinations of those arrangements. In a further exemplary embodiment, the control system 100 can be formed from more or less nodes 210, 215 and/or node networks 212 than those shown in FIG. 2.

In one exemplary embodiment, each node 210, 215 can be independently operated and self-aware, and can also be aware of at least one other node 210, 215. In other words, each node 210, 215 can be aware that at least one other node 210, 215 is active or inactive (e.g., online or offline).

In another exemplary embodiment, each node 210, 215 is independently operated using decentralized processing, thereby allowing the control system 100 to remain operational even if a node 210, 215 may fail because the other operational nodes still have access to the operational data of the nodes. Each node 210, 215 can be a current connection into the control system 100, and can have multiple socket connections into the network, each providing node communications into the control system through the corresponding node 210, 215. As such, as each individual node 210, 215 is taken "offline," the remaining nodes 210, 215 can continue operating and load share. In a further exemplary embodiment, the control system can provide the operational data for each node to every other node 210, 215 all the time, regardless of how each node 210, 215 is related to each other node 210, 215.

Figure 7:
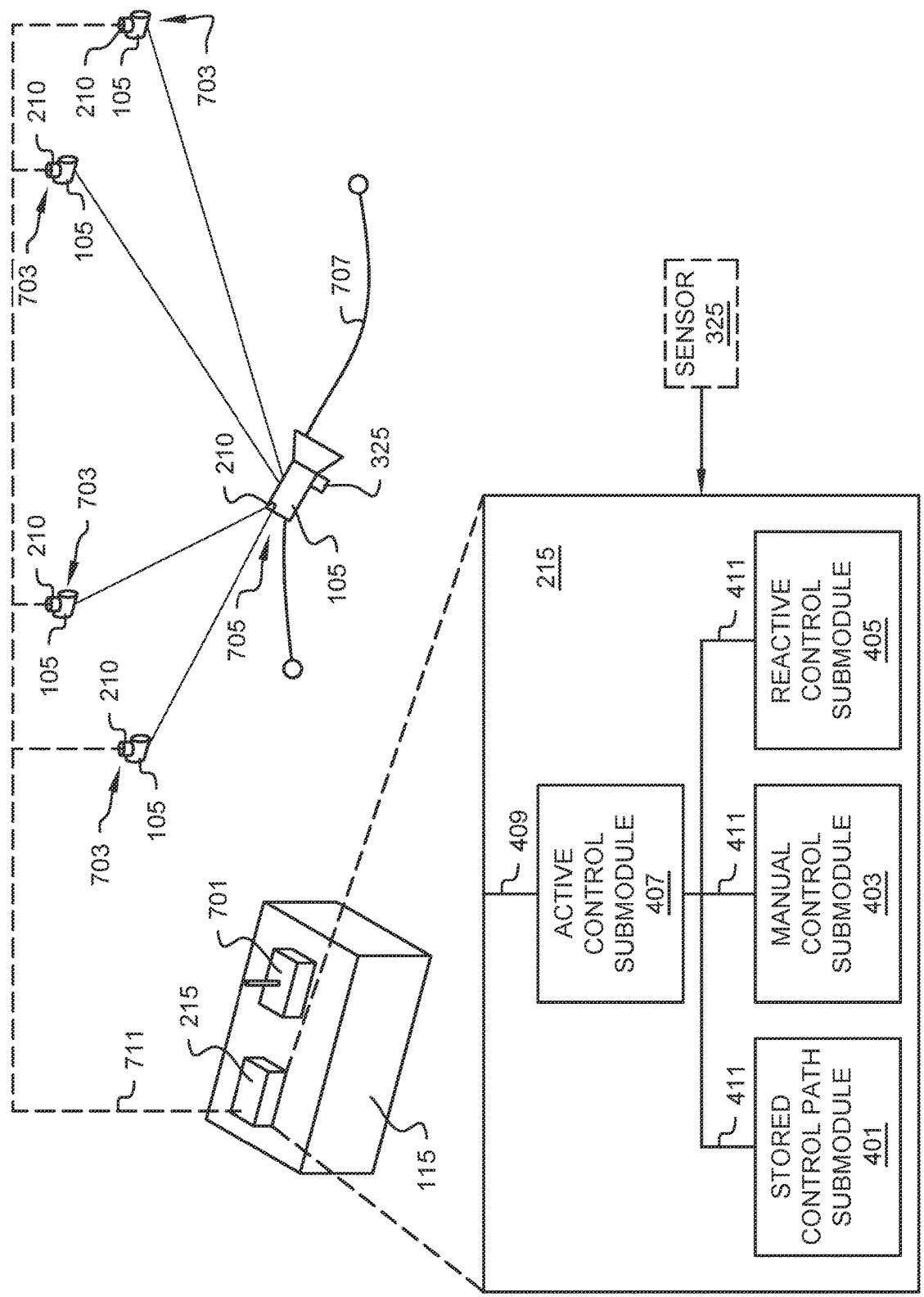
FIG. 7 shows a diagram showing an example of motion control for a device where the selected active control signal is provided by the reactive control module according to an embodiment of the present disclosure.

In one exemplary embodiment, node 210 may correspond to an "axis" device 105 (see FIG. 7). The "axis" device can be used represent a piece of machinery that moves an object. In another embodiment, the "axis" device may be an I/O device whereby boolean and numeric values may be controlled. For example, a node may have an I/O device boolean controller to energize or denergize a relay, command a function in a fixture to turn on/off (e.g., camera ND filter on/off, camera record start/stop, lighting fixture diffuser on/off etc.), or numeric controller to command an 0-10V output, 4 . . . 20 mA output, or some digitally manifest numeric signal (e.g., a lighting fixture dimmer 0-100%, a camera white balance setting, etc.). The control system 100 can be used with a variety of different axis devices that correspond to the controllers for the end machines that make theatrical objects move and/or change state. Examples of axis devices may include engines, motors (AC/DC), servos, hydraulic movers, and pneumatic movers. Examples of machinery that may include motion include, but are not limited to lifts, chain hoists, winches, elevators, carousels, turntables, hydraulic systems, pneumatic systems, multi-axis systems, and linear motion systems (e.g., deck tracks and line sets).

Figure 3:
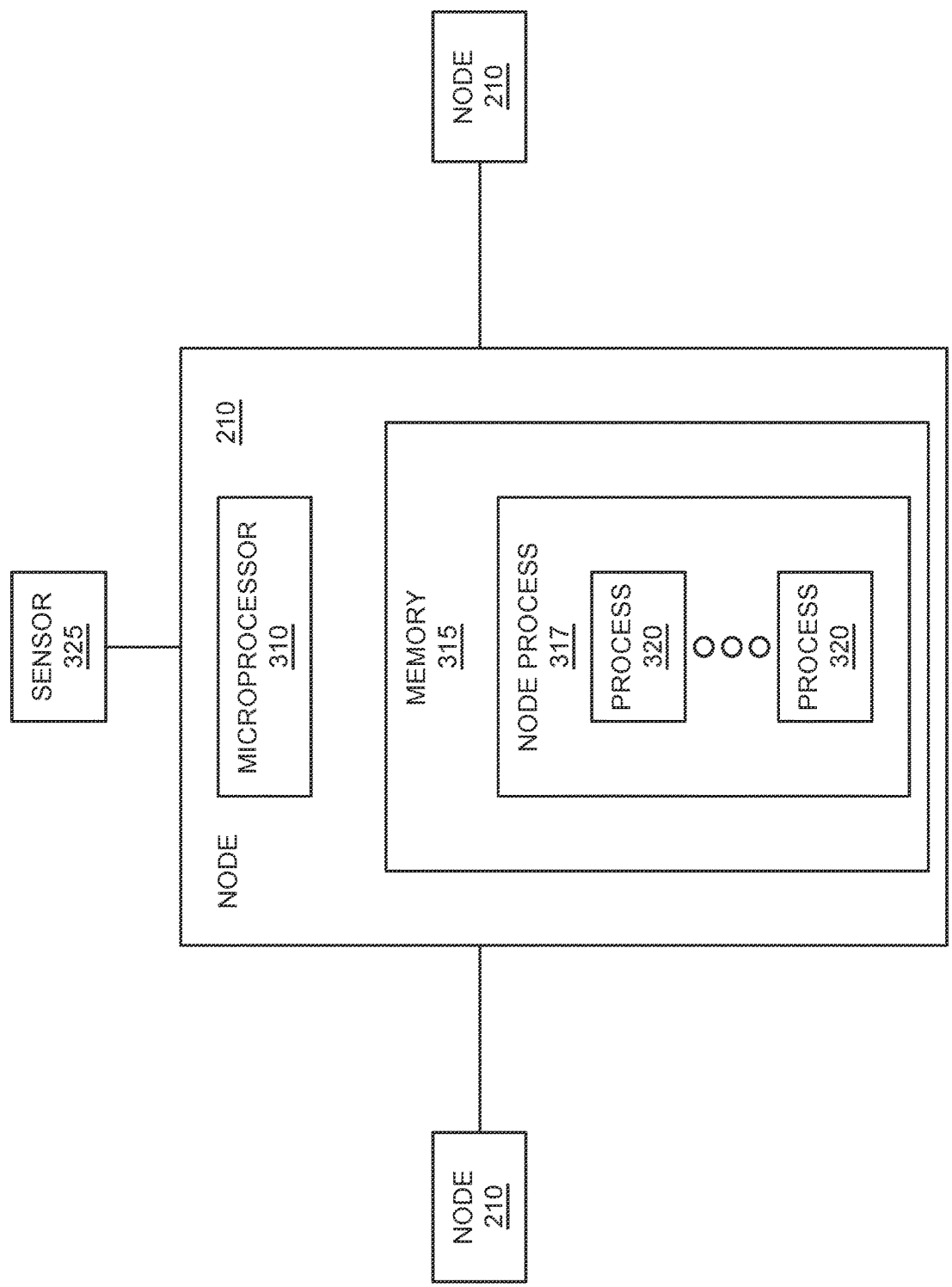
FIG. 3 schematically shows an embodiment of a node from the automation and motion control system according to the present disclosure.

FIG. 3 schematically shows an exemplary embodiment of a node 210. Each node 210 includes a microprocessor 310 and a memory device 315. The memory device 315 can include or store a main or node process 317 that can include one or more sub- or co-processes 320 that are executable by the microprocessor 310. The main or node process 317 provides the networking and hardware interfacing to enable the sub- or co-processes to operate.

The microprocessor 310 in a node 210 can operate independently of the other microprocessors 310 in other nodes 210. The independent microprocessor 310 enables each node 210 in the control system 100 to operate or function as a "stand-alone" device or as a part of a larger network. In one exemplary embodiment, when the nodes 210 are operating or functioning as part of a network, the nodes 210 can exchange information, data and computing power in real time without recognizing boundaries between the microprocessors 310 to enable the control system 100 to operate as a "single computer." In another embodiment, each node 210 may use an embedded motion controller.

Node 210 may include sensors 325 that may gather real-time or dynamic data. Sensors 325 may be any data collecting device that is capable of providing data useful for determining a location, state or property of a device 105 corresponding to node 210. Some examples of dynamic or real-time information that can be measured with sensors 325 can include temperature, current, load or weight (load cell), angle, g-force or acceleration (accelerometer), direction of movement, or speed of movement. Suitable sensors 325 may include tertiary real time positioning systems (e.g., optical tracking, such as BlackTrax™, GPS/GNSS, Bluetooth Beacons, LIDAR systems, etc.) that provide moving target coordinates for use by node 210. Other suitable sensors 325 may include, but are not limited to inertia sensor (e.g., accelerometers, gyro-sensors, etc.), global positioning system (GPS) sensors, voltage meters, temperature sensors, contact or non-contact displacement sensors (e.g., linear variable differential transformers (LVDT), differential variable reluctance transducers (DVRT)), slide potentiometers, radar sensors, LiDAR sensors, magnetic sensing systems, optical or infrared sensing systems, radio frequency identification (RFID) sensors or any combination thereof.

Figure 4:
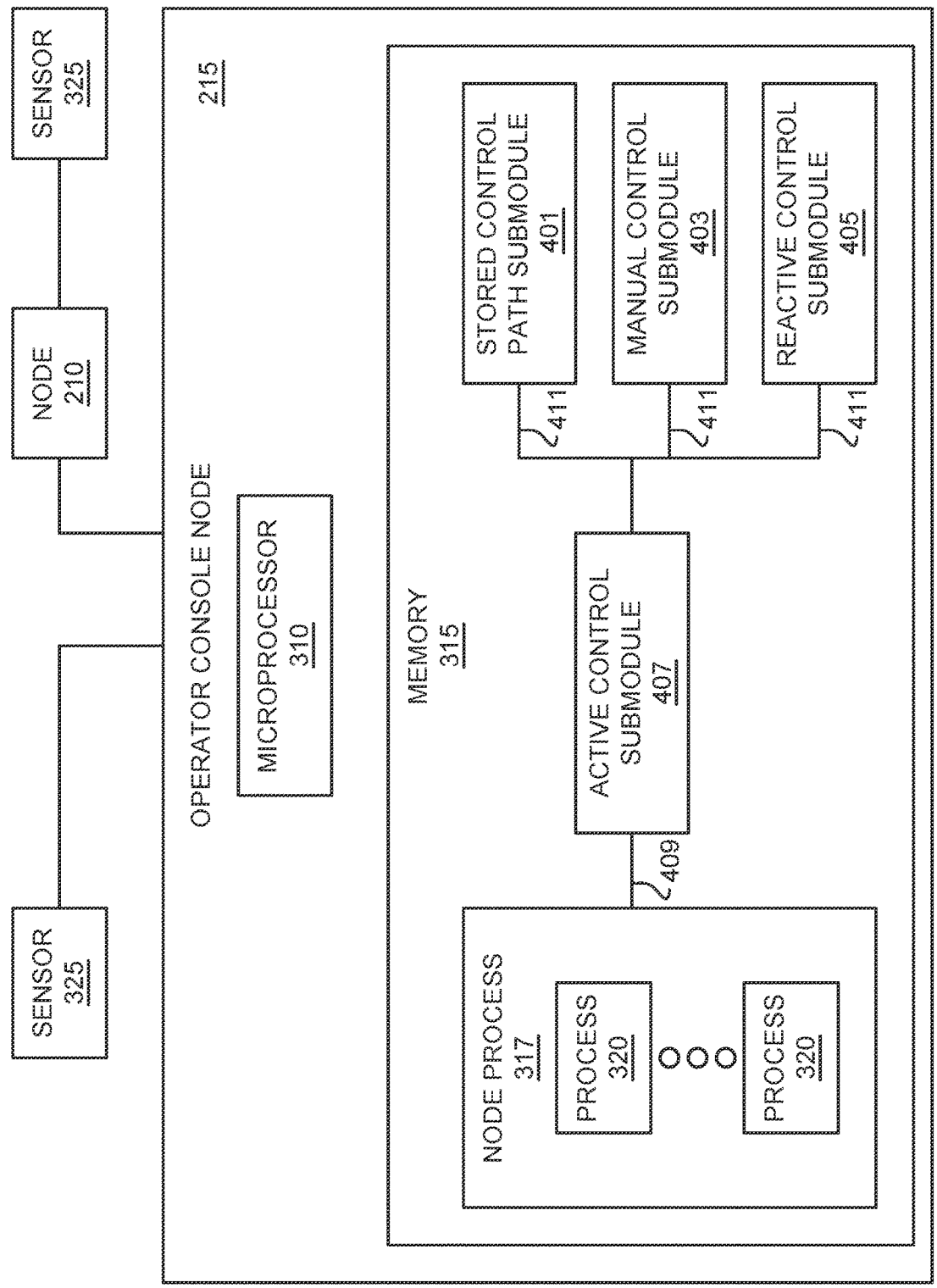
FIG. 4 schematically shows an embodiment of an operator console node from the automation and motion control system according to the present disclosure.

FIG. 4 schematically shows an exemplary embodiment of an operator console node 215. Each operator console node 215, like node 210, includes a microprocessor 310 and a memory device 315. The memory device 315 can include or store a main or node process 317 that can include one or more sub- or co-processes 320 that are executable by the microprocessor 310. The main or node process 317 provides the networking and hardware interfacing to enable the sub- or co-processes to operate.

The microprocessor 310 in an operator console node 215 can operate independently of the other microprocessors 310 in other an operator console nodes 215. The independent microprocessor 310 enables each operator console node 215 in the control system 100 to operate or function as a "stand-alone" device or as a part of a larger network. In one exemplary embodiment, when the operator console nodes 215 is operating or functioning as part of a network, the operator console nodes 215 can exchange information, data and computing power in real time without recognizing boundaries between the microprocessors 310 to enable the control system 100 to operate as a "single computer." In another embodiment, each node 210 may use an embedded motion controller.

Like node 210, operator console node 215 may include sensor 325. Sensor 325 provides information to operator console node 215 including real-time or dynamic data. Sensors 325 may be any data collecting device that is capable of providing data useful for determining a location, state or property of a device 105, including any of the sensors 325 shown and described above with respect to node 210.

Within the memory 315, the operator console node 215 includes a stored control path submodule 401, a manual control submodule 403 and a reactive control submodule 405. Each of the stored control path submodule 401, the manual control submodule 403 and the reactive control submodule 405 generate an independent control signal 411. An active control submodule 407 provides a summed control signal 409 to the node process 317 in response to the independent control signal 411 from each of the stored control path submodule 401, the manual control submodule 403 or the reactive control submodule 405 to provide control to the at least one device 105 and associated theatrical devices.

The stored control path submodule 401 includes instructions, configured to perform control of device 105 that provides motion and control of the device along a pre-programmed path. The stored control path submodule 401 includes instructions, data or code that are written to provide a signal that, when sent to the node 210 associated with device 105, provides control to device 105 to results in motion and control of device 105 according to a stored, pre-determined motion and control. In the stored path submodule 401, motion profiles are preplanned (e.g., a performer walks a predetermined path over a set amount of time, vehicle motion is played back on a set interval by a tertiary motion control system, etc.) and expected target coordinates are streamed to system 100 through its integrated playback engine. In this control scheme, position/motion may be with respect to time. While preprogrammed position targets are generally immutable—the time variable may be altered live. That is, time, or more plainly said the profile, may be paused, slowed, or sped up to effect final positing output.

The manual control submodule 403 includes instructions, configured to perform control of device 105 that provides motion and control of the device utilizing manual control. The manual control submodule 403 includes instructions, data or code that are written to provide a signal that, when sent to the node 210 associated with device 105, provides manual control to device 105 utilizing a manual control device 701, such as a touch screen encoded pan bars, joysticks, and wheel encoders. (see, for example, FIGS. 7-10). In this control scheme, position/motion is in direct correlation to manual inputs. That said, the manual input may still undergo processing such as scaling, smoothing, or motion limits to affect the final motion control.

The reactive control submodule 405 includes instructions, configured to perform control of device 105 that provides motion and control of the device utilizing automated methods. The reactive control submodule 405 includes instructions, data or code that are written to provide a signal that, when sent to the node 210 associated with device 105, provides an automated control to device. By automated control, it is meant that the motion and properties of device 105 are controlled in response to conditions and/or signals from system 100, including, for examples sensors 315. In one embodiment, the operator may manually update the target position of device 105 via an encodable input mechanism (i.e., dragging the target position in the digital twin to match the real-world position on a computer, touchscreen, or some other encodable surface). In another embodiment, position of the device 105 may be updated automatically by means of an encodable tracking technology. In this control scheme, position/motion is in an indirect relationship to system inputs. That is, a transformation of positional information needs to occur in order for the information to be fed to the fixture as a control input. For example—if a target moves 10' in the x direction, a calculation must occur to transform a 10' delta into an angular command that is used to control the fixture. This transformation is not required to be 1:1.

Additional submodules may also be provided in parallel to the stored control path submodule 401, the manual control submodule 403 and the reactive control submodule 405 to provide additional control elements that likewise can be utilized in real time. For example, although not shown in FIG. 4, the operator console node 215 may include a condition submodule in parallel connection with the active control submodule 407 and each of the stored control path submodule 401, the manual control submodule 403 and the reactive control submodule 405. In this embodiment, the condition submodule provides an independent control signal 411 that provides a condition or special effect for the device 105. For example, in embodiments where device 105 is a camera, a condition may be a visual condition, such as cue, focus, or other visual effect.

The active control submodule 405 includes instructions, configured to provide a summed control signal 409 to node process 317 for control of device 105. The active control submodule 405 includes instructions, data or code that are written to provide a signal that, when sent to the node 210 associated with device 105, provides an automated control to device 105. By automated control, it is meant that the motion and properties of device 105 are controlled in response to conditions and/or signals from system 100, including, for examples sensors 315. The active control submodule 405 may be software or hardware that inputs independent control signals 411 and outputs a summed control signal 409 that corresponds to a desired control for device 105. For example, the active control submodule may provide a "summing" control architecture to generate the summed control signal 409. That is, all other submodules may be selectively combined so that they may all affecting fixture control concurrently. For instance, if the reactive control submodule 405 is providing the dominant control signal (i.e., a control signal scaled to be the control signal that provides the primary control, which may be scaling up to 100%) in the summed control signal 409 and a positioning system signals (e.g., a sensor 325) that the accuracy of position is degraded, such as an indicator that a GPS system has a low satellite link count, the active control submodule 407 may alert the user that manual control is needed and begins to sum the signals from the reactive control module 405 and manual control module 403 together. Depending on position confidence rating from the positioning source, the active control module 407 may scale how dominant the independent control signals 411 from the reactive control submodule 405 and manual control submodule 403 are with respect to the desired final output. For instance, using the example of a GPS system, if satellite links are abundant and strong the active control module 407 may output the positional commands from the reactive control module 405 at 100% scaling. If, instead, the GPS system only has a link to three satellites it may be deemed that positional accuracy is low and final control output to the fixture is a sum of the reactive control module at 20% scaling and the manual control module at 80% scaling. This scaling determination provided by the active control submodule 407 may occur automatically as described above or may be specified manually by the user by way of manual input sources or triggered automatically via preprogrammed cues or conditions e.g., if the positioning system values jump more than 20% from one reading to the next, we infer the system has malfunctioned and scale the manual control submodule output to 100%.

Figure 5:
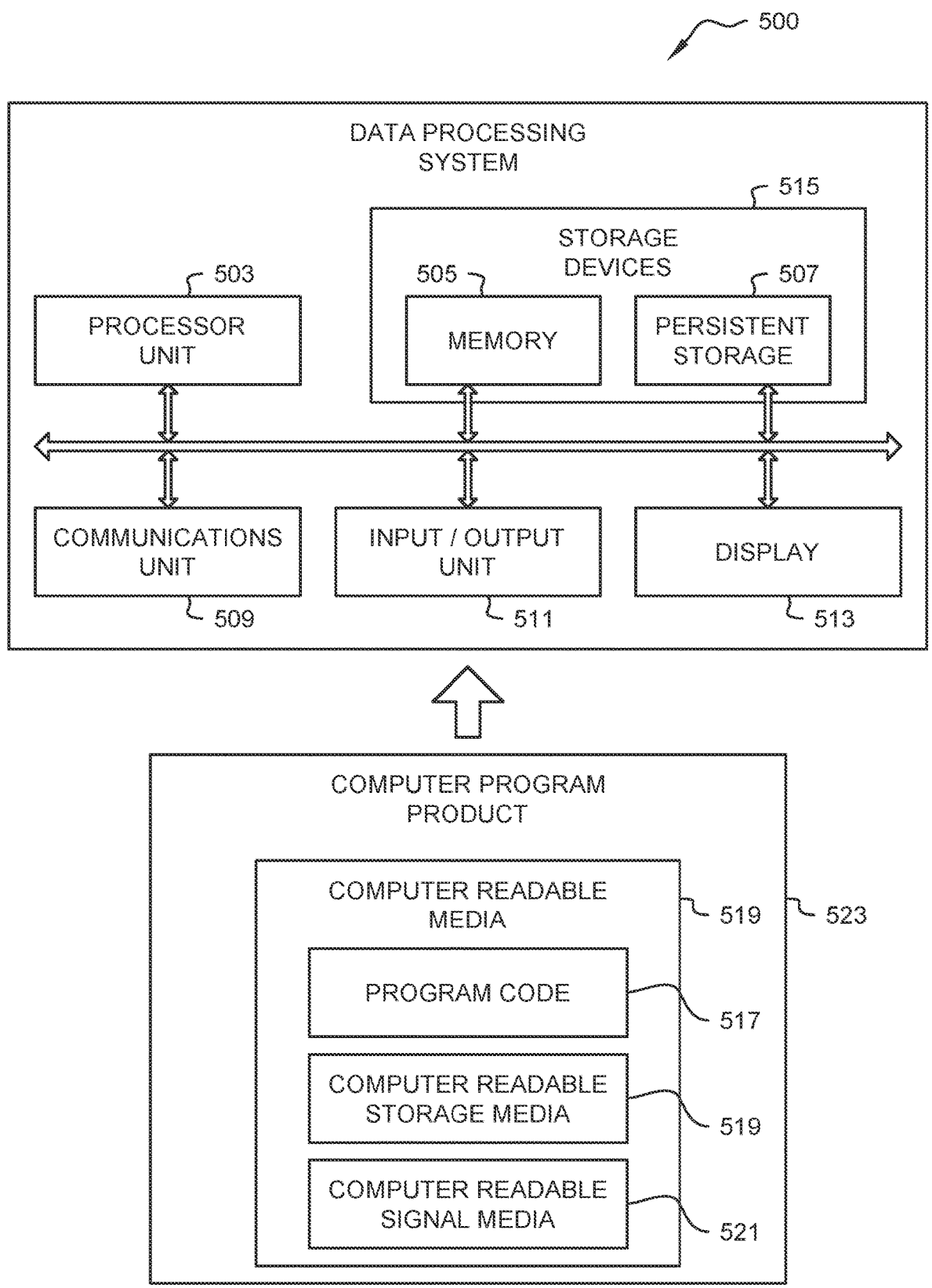
FIG. 5 illustrates a data processing system according to an embodiment of the present disclosure.

FIG. 5 shows an exemplary illustration of a data processing system 500 suitable for use as components of the system, including, but not limited to node 210 and operator console node 215. In this illustrative example, data processing system 500 may include communications fabric 501, which provides communications between processor unit 503, memory 505, persistent storage 507, communications unit 509, input/output (I/O) unit 511 and display 513. While FIG. 5 shows various elements including processor unit 503, memory 505, persistent storage 507, communications unit 509, input/output (I/O) unit 511, and display 513, some or all of the elements may be present for particular configurations of node 210 and/or operator console node 215. For example, certain nodes may not utilize input/output (I/O) unit 511 and display 513. The utilization or particular components is dependent upon the functionality needed for a particular node 210 or operator console node 215.

Processor unit 503 may be one or a number of processors, a multi-processor core, or some other type of processor, depending on the particular implementation. A number, as used herein with reference to an item, means one or more items. Further, processor unit 503 may be implemented using a number of heterogeneous processor systems in which a main processor is present with secondary processors on a single chip. As another illustrative example, processor unit 503 may be a symmetric multi-processor system containing multiple processors of the same type.

Memory 505 and persistent storage 507 are examples of storage devices 515. A storage device is any piece of hardware that is capable of storing information, such as, for example, without limitation, data, program code in functional form, and/or other suitable information either on a temporary basis and/or a permanent basis. Storage devices 515 may also be referred to as computer readable storage devices in these examples. Memory 505, in these examples, may be, for example, a random access memory or any other suitable volatile or non-volatile storage device. Persistent storage 507 may take various forms, depending on the particular implementation.

For example, persistent storage 507 may contain one or more components or devices. For example, persistent storage 507 may be a hard drive, a flash memory, a rewritable optical disk, a rewritable magnetic tape, or some combination of the above. The media used by persistent storage 507 also may be removable. For example, a removable hard drive may be used for persistent storage 507.

Communications unit 509, in these examples, provides for communications with other data processing systems or devices. In these examples, communications unit 509 is a network interface card. Communications unit 509 may provide communications through the use of either or both physical and wireless communications links.

Input/output (I/O) unit 511 allows for input and output of data with other devices that may be connected to data processing system 500. For example, input/output (I/O) unit 511 may provide a connection for user input through a keyboard, a mouse, and/or some other suitable input device. Further, input/output (I/O) unit 511 may send output to a printer. Display 513 provides a mechanism to display information to a user.

Instructions for the operating system, applications, and/or programs may be located in storage devices 515, which are in communication with processor unit 503 through communications fabric 501. In these illustrative examples, the instructions are in a functional form on persistent storage 507. These instructions may be loaded into memory 505 for execution by processor unit 503. The processes of the different embodiments may be performed by processor unit 503 using computer implemented instructions, which may be located in a memory, such as memory 505.

These instructions are referred to as program code 517, computer usable program code, or computer readable program code that may be read and executed by a processor in processor unit 503. The program code 517 in the different embodiments may be embodied on different physical or computer readable storage media, such as memory 505 or persistent storage 507.

Program code 517 is located in a functional form on computer readable storage media 519 that is selectively removable and may be loaded onto or transferred to data processing system 500 for execution by processor unit 503. Program code 517 and computer readable storage media 519 form computer program product 523 in these examples. In one example, computer readable storage media 519 may be computer readable storage media 519 or computer readable signal media 521. Computer readable storage media 519 may include, for example, an optical or magnetic disk that is inserted or placed into a drive or other device that is part of persistent storage 507 for transfer onto a storage device, such as a hard drive, that is part of persistent storage 507. Computer readable storage media 519 also may take the form of a persistent storage, such as a hard drive, a thumb drive, or a flash memory, that is connected to data processing system 500. In some instances, computer readable storage media 519 may not be removable from data processing system 500.

Alternatively, program code 517 may be transferred to data processing system 500 using computer readable signal media 521. Computer readable signal media 521 may be, for example, a propagated data signal containing program code 517. For example, computer readable signal media 521 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 517 may be downloaded over a network to persistent storage 507 from another device or data processing system through computer readable signal media 521 for use within data processing system 500. For instance, program code stored in a computer readable storage medium in a server data processing system may be downloaded over a network from the server to data processing system 500. The data processing system providing program code 517 may be a server computer, a client computer, or some other device capable of storing and transmitting program code 517.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 503 may take the form of a hardware unit that has circuits that are manufactured or configured for a particular use. This type of hardware may perform operations without needing program code to be loaded into a memory from a storage device to be configured to perform the operations.

For example, when processor unit 503 takes the form of a hardware unit, processor unit 503 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 517 may be omitted because the processes for the different embodiments are implemented in a hardware unit.

In still another illustrative example, processor unit 503 may be implemented using a combination of processors found in computers and hardware units. Processor unit 503 may have a number of hardware units and a number of processors that are configured to run program code 517. With this depicted example, some of the processes may be implemented in the number of hardware units, while other processes may be implemented in the number of processors.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid-state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example, without limitation, physical or wireless.

A data processing system 500 suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

Figure 6:
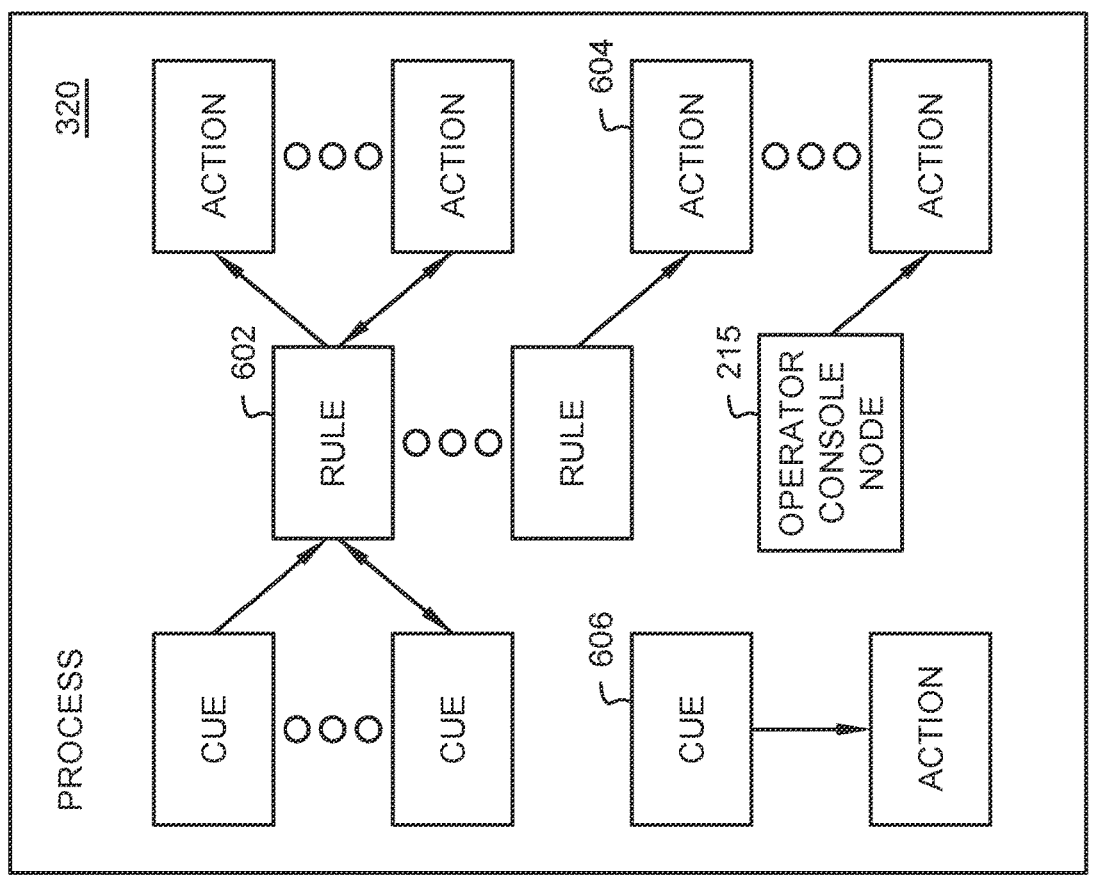
FIG. 6 schematically shows an embodiment of a sub- or co-process of a node process according to an embodiment of the present disclosure.

FIG. 6 schematically shows an exemplary embodiment of a sub- or co-process for node 210, 215. Each sub- or co-process 320 includes one or more actions 604 that can be triggered by one or more rules 602 and/or one or more cues 606 or by a direct command from an operator console node 215. In another embodiment, one or more cues 606 can trigger one or more rules 602 or one or more actions 604 can trigger one or more rules 602. For example, one or more rules 602 can initiate one or more actions 604 in response to one or more cues 606.

In one exemplary embodiment, each rule 602 can be an if-then or an and-or statement or other similar type of case or logic statement. The cues 606 can be associated with the "if" conditions of the rule and can include measured parameters, e.g., velocities, accelerations, positions, voltages, currents, etc., and logic inputs, e.g., "1s" or "0s," from other nodes or devices. The actions 604 can be associated with the "then" portion of the rule and can include controlling an operating speed of the machine(s) associated with the node or device, sending messages or commands to other nodes or devices, changing operational status, e.g., on or off, of system components, e.g., lights, relays or switches.

In one exemplary embodiment, an axis process can be a software algorithm executed on the microprocessor of a corresponding node to generate instructions to move a motor on a winch to wind or reel. For example, if an instruction is given to move a theatrical object at the end of a cable of a winch a total of 30 feet at 4 feet per second and then stop, the axis process can perform all of the calculations required to generate the voltages and currents necessary for the motor to accomplish the desired cable movement.

Figure 8:
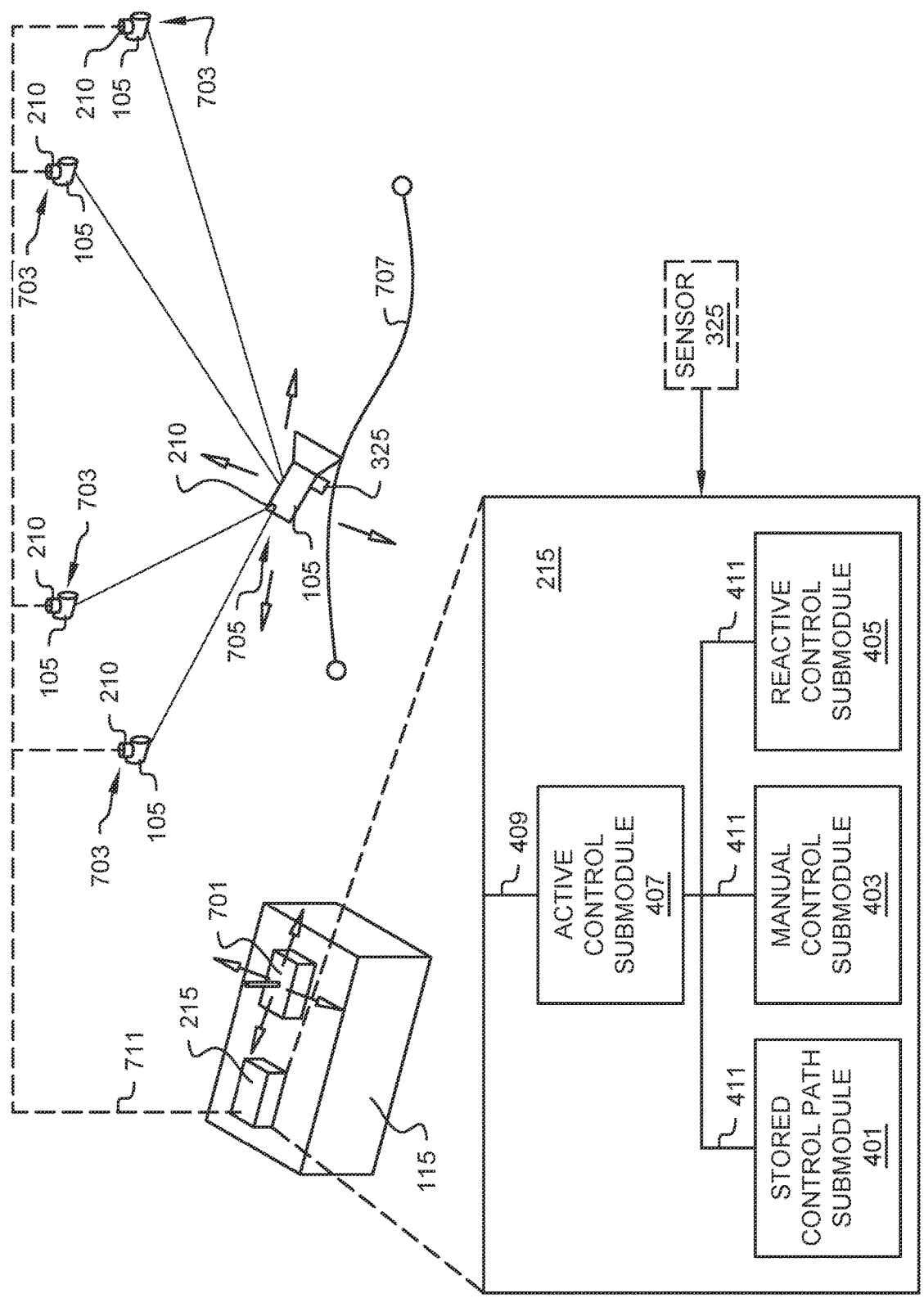
FIG. 8 shows a diagram showing an example of motion control for a device according to an embodiment of the present disclosure.
Figure 9:
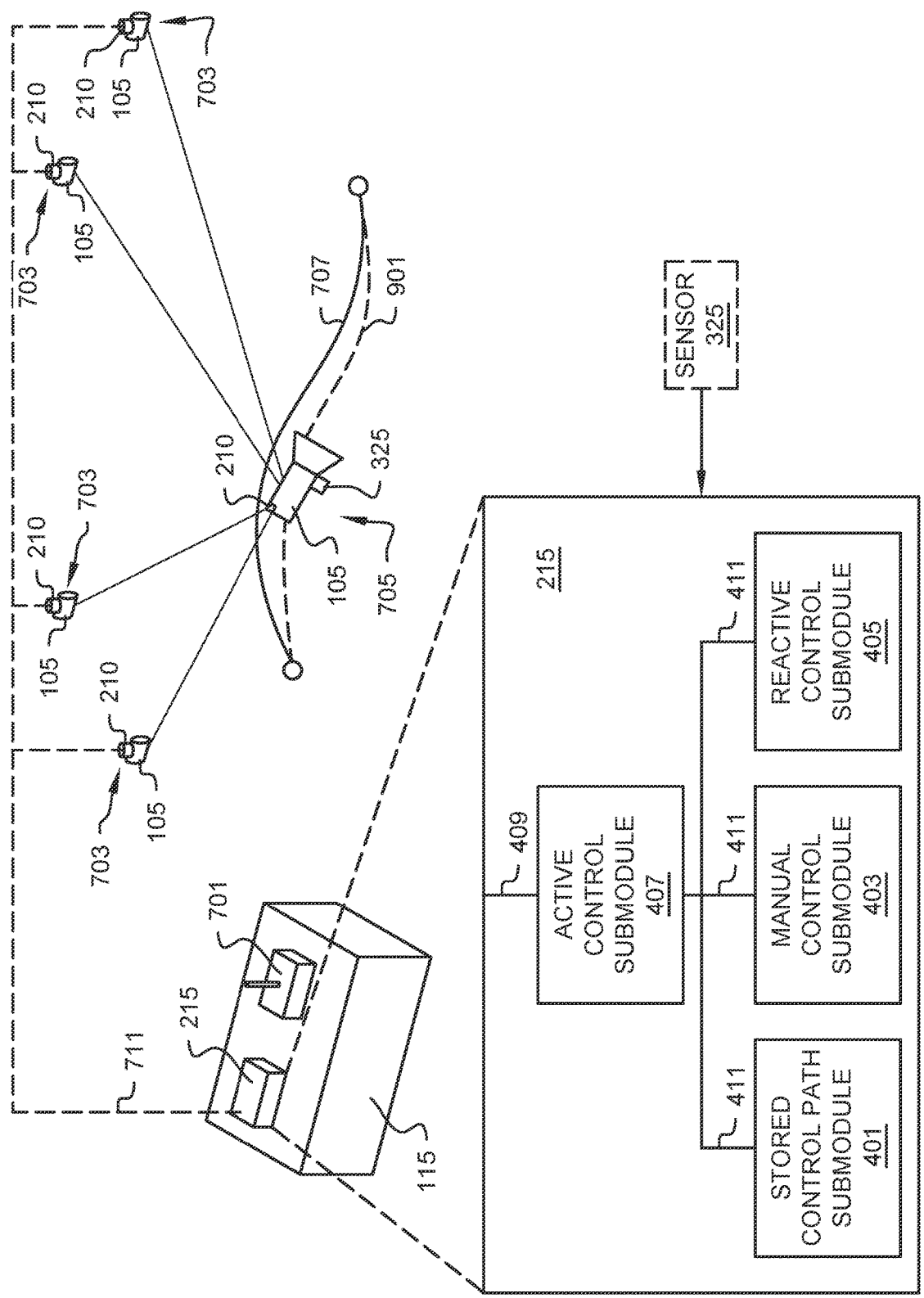
FIG. 9 shows a diagram showing an example of motion control for a device according to another embodiment of the present disclosure.

FIG. 7-10 show examples of an automation and motion control system 100 according to the present disclosure. As shown in each of FIGS. 7-10, devices 105 include theatrical objects, specifically winches 703 and camera 705. As shown in FIGS. 7-10, camera 705 is suspended from winches 703 and is directed along a motion path 707 suspended from winches 703. In the embodiment shown, winches 703 and camera 705 each include a node 201, which are connected to operator node 215 to provide a control arrangement for controlling winches and camera 705. The connections between operator node 215 and nodes 210 may be control line 709, which may be wired or wireless connection. FIGS. 7-10 show a blown-up schematic view of the functioning of the operator console node 215. In this blown-up version of the operator console node 215, the stored control path submodule 401, the manual control submodule 403, the reactive control submodule 405, and the active control submodule 407 are schematically shown to illustrate the control signal selected from for the various types of control. Independent control signals 411 are generated from each of the stored control path submodule 401, the manual control submodule 403, and the reactive control submodule 405. The active control submodule 407 inputs the independent signals 411 and outputs a summed control signal 411 to a node process (not shown in FIGS. 7-10, see for example, FIG. 4). The control signal from the node process is provided via control line 709 to nodes 210 of devices 105. In the example shown in FIGS. 7-9, to provide the motion of camera 705, winches 703 are cooperatively controlled with instructions relating to a control signal received from operator node 215. In addition, as shown in FIGS. 7-9, sensors 325 provide position and condition information about devices 105 and provide that information to nodes 210 and/or operator node 215. The position and condition information from sensors 325 is utilized in generating the control signal for certain modes. For example, the sensors 325 may provide position information that may be utilized for collision avoidance for moving devices 105, such as camera 705. As shown in FIGS. 7-9, the sensors 325 may be positioned at a remote location that provides remote sensing of the devices 105 or may be positioned on or near devices 105 (as shown with respect to camera 705). The positioning of sensors 325 is not limited to the arrangement shown in FIGS. 7-9 and is only limited in the manner that the position and condition of devices 105 may be sensed.

In FIG. 7, the motion path 707 is a pre-determined path that is pre-programmed and stored to provide the cooperative control of winches 703 to guide camera 705 along the motion path 707. As shown in the blown-up schematic view of the operator console node 215, the operator console node 215 may, in certain embodiments, utilize an independent control signal 411 from stored control path submodule 401. If the independent control signal 411 is selected to be dominant or scaled at or near 100% by the active control submodule 407, the stored path may be followed using the pre-programmed path and/or positioning. In this embodiment, the summed control signal 411 outputted from the active control submodule 407 reflects the independent control signal 411 from the stored control path submodule 401. Although the path is shown in an example wherein the scaling includes 100% of the independent control signal 411 from the stored control path submodule 401, the present disclosure is not so limited and may include any percentage or scaling of the independent control signal 411 from the stored control path submodule 401 required for the desired control of device 105.

As shown and described with respect to FIG. 7, the system and method according to the present disclosure supports programmatically driven positioning provided by independent control signal 411 from stored control path submodule 401. This control mechanism exposes a digital control input for each controllable system axis. These registers may, for instance, be used to playback prerecorded profiles, or motion profiles mathematical defined and generated in real time. This control method may be active concurrently to automated tracking and/or manual control input mechanism to achieve advanced effects. For example, with tracking mechanism enabled a camera could automatically follow a moving target and a function defining a circular path could be added to the programmatically driven positioning mechanism causing the camera to move in a circular path around the target centroid position being driven by the automatic tracking calculator.

As shown in FIG. 8, the motion control of camera 705 may include control that is scaled or summed to include manual control, including manual control from manual control submodule 403. As shown in the blown-up schematic view of the operator console node 215, the operator console node 215 utilizes an independent control signal 411 from manual control submodule 403. The active control submodule 407 may scale the manual control to be dominant or scaled at or near 100% by the active control submodule 407. For example, the manual control permits motion of the camera 705 away from or different from the motion path 707. The control is provided by the manual control device 701. In addition to the raw target positions, the system and method according to the present disclosure utilizing the summed independent control signal 411 from manual control submodule 403 to provide a mechanism to add offsets to the target position in each Euclidean direction. This offset may be added manually or programmatically (see, for example, FIG. 8).

While automated target tracking may be the system's primary control method, importantly, the system and method according to the present disclosure also allows for the simultaneous real time offsetting of the calculated target position utilizing the manual control submodule 403, which may be scaled to be dominant by the active control submodule 407. This mode of operation allows for external control inputs to effect payload heading. This mode of operation may be beneficial in situations where traditional tracking systems perform poorly, and/or where real time target tracking data is not available, and/or using other tracking subsites is not feasible. The system and method according to the present disclosure allows for a variety of control inputs common to camera controls systems including but not limited to, encoded pan bars, joysticks, and wheel encoders. Each input type has user modifiable scaling, response curves, and smoothing/damping functions to allow users to customize input source response to individual preference. Parameters such as smoothing, scaling, etc. can all be changed on the fly in real time. Additionally, users may specify the maximum influence manual inputs may have on payload positioning by specifying maximum adjustment offsets and/or maximum/minimum velocity used to achieve manual input commanded positions. The system and method according to the present disclosure is designed to allow zero to infinitely many manual control sources to offset calculated tracking position targets concurrently. Additionally, or alternatively the tracking calculation functions may be turned off and the payload solely responds to inputs from the manual control source.

As shown in FIG. 9, the motion control of camera is selected to automated control, including a control signal from the reactive control submodule 405. As shown in the blown up schematic view of the operator console node 215, the operator console node 215 utilizes an independent control signal 411 from reactive control submodule 405 in order to form summed control signal 411. In this embodiment, when the active control submodule 407 scales the automated control from the reactive control submodule 405 to be dominant or scaled at or near 100% by active control submodule 407, the independent control signal 411 generated by the reactive control submodule 405 may correspond to position and conditions sensed from sensors 325 that provide an automated path 901. The system and method according to the present disclosure allows the user to specify multiple smoothing constants that can be used to gradually shift the payload heading from one target to another, or to reduce potential jerkiness in real time target position streaming data. These smoothing constants may be adjusted by the user "on the fly" in real time or programmatically to achieve desired results.

Figure 10:
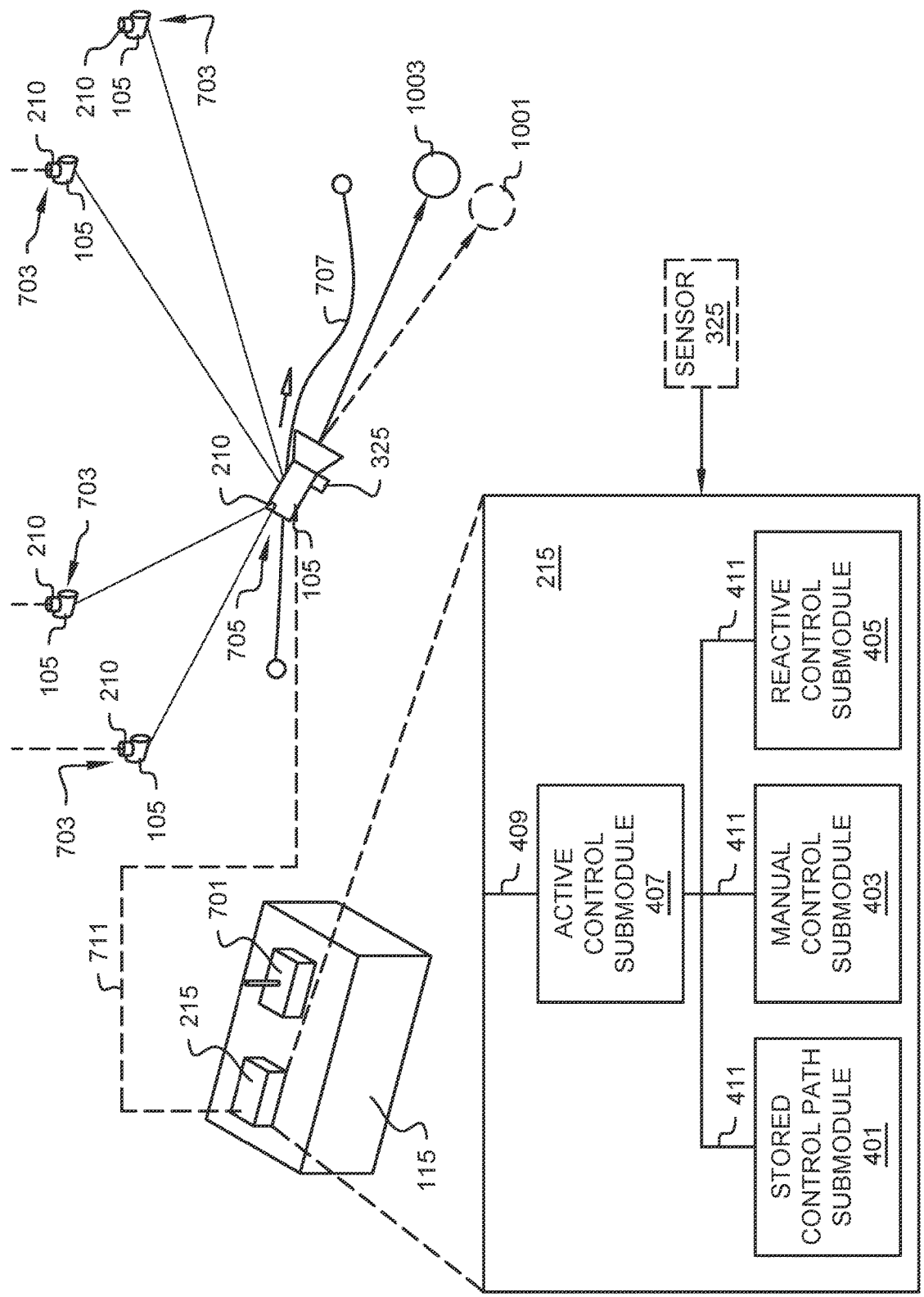
FIG. 10 shows a diagram showing an example of motion control for a device according to another embodiment of the present disclosure.

Another example of a summed control signal 409 is shown in FIG. 10, where a camera 705 with a given known payload position and the target position calculates a pan, tilt, and roll value to point the payload at the target. These values may be bound by the user to match the physical limitation of the payload. In the example shown in FIG. 10, to provide pan, tilt, and roll value of camera 705 the camera is controlled via instructions provided via control line 709, the instructions relating to a summed control signal 409 generated by active control submodule 407 within operator node 215. In addition, as shown in FIGS. 10, sensors 325 provide position and condition information about devices 105 and provide that information to nodes 210 and/or operator node 215. The position and condition information from sensors 325 is utilized in generating the control signal for certain modes. For example, camera 705 may be focused on a first target 1001. That is, for example, camera 705 may have optical focus on first target 1001 or may be oriented to point toward first target 1001. However, sensors 325 or other indicators, such as visual verification of the operator, may sense that a desired target is actually a second target 1003. Accordingly, the summing provided by active control submodule 407 may be adjusted to provide a greater scaling of manual control by manual control submodule 403 or reactive control by reactive control submodule 405 to provide the control to the camera 705 to focus on second target 1003.

Depending on physical limitations of the payload, the positioning system may implement a variety of measures to ensure the payload stays pointed at the target, especially during high-speed maneuvers. For instance, a motor may have a limited ability to accelerate when moving quickly past a target. To keep the payload pointed at the target in these instances, it may be desirable to command the payload to preemptively target a position in front of the target's actual location. To achieve this the system and method according to the present disclosure may employ a variety of predictive motion control (a.k.a. feed forward) algorithms that would be known to one skilled in the art. Additionally or alternatively, a feed forward/predictive controls algorithm may be applied to continue "tracking" a target in the event of momentary target tracking system information loss.

In addition to the angular positional targets of the payload, the system and method according to the present disclosure may also calculate linear axial targets such as, but not limited to, focal length, focus, intensity, iris, permissives/enables, etc. Using these features requires the user to additionally input a desired field of view, focus point, or exclusion zones based on the control axis type. For instance, if the system payload is a camera with the ability to control zoom and focus, the user may specify a desired equivalent focal length or total frame size as well as the lens zoom curve and focus curve. Given a known distance from the target, the system automatically commands the camera to zoom in as the payload moves away from the target or zoom out as the payload moves closer to the target to keep a consistent framing regardless of camera position. Focus can also be automatically controlled in a similar manner. Likewise, for a lighting fixture, zoom and iris may be automatically controlled to keep a consistent light spot size as a lighting truss, for instance, moves up and down.

Figure 11:
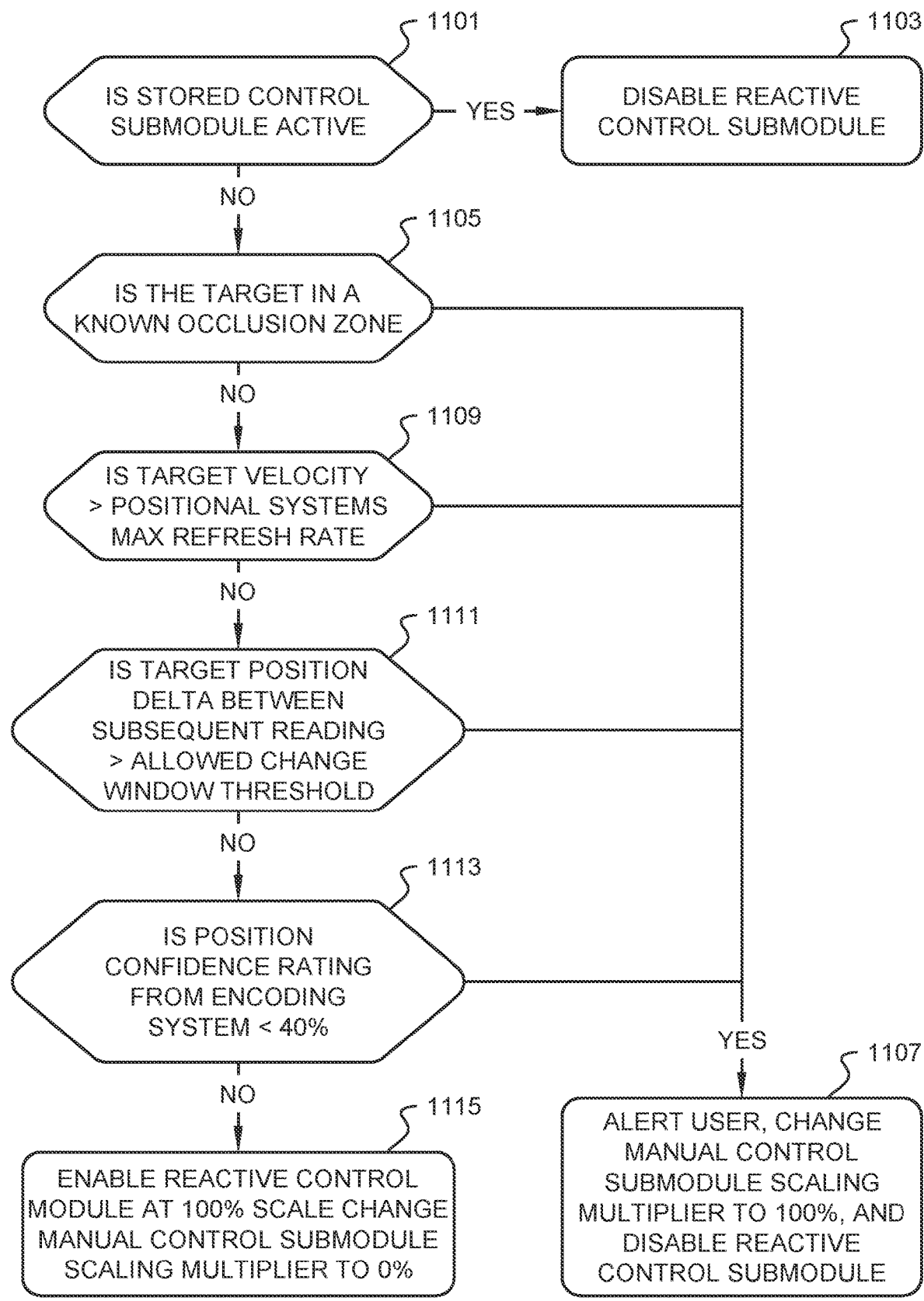
FIG. 11 shows a process flow that provides a summing method for the active control submodule according to an embodiment of the present disclosure.

FIG. 11 shows a process flow that provides a summing method for the active control submodule 407 according to an embodiment of the present disclosure. As shown in FIG. 11, the active control submodule 407 inputs independent control signals from each of the stored control path submodule 401, manual control submodule 403 and reactive control submodule 405 and provides an output summed control signal 409. The operator console node 215 analyzes an input from the stored control path submodule 401 (step 1101) and determines with the independent control signal 411 from the stored control path submodule 401 is active. If the stored control path submodule 401 is active, the active control submodule 407 will disable the reactive control submodule 405 (step 1103) by reducing the summed value of the independent control signal from the stored control path submodule to zero. If the stored control submodule 401 is determined not to be active, the position of the target is determined, for example by sensor 325 (step 1105) and, if the target is in a known occlusion zone (e.g., resulting in potential collisions or unsafe positioning), the user is alerted and the active control submodule 407 outputs a summed control signal 409 including 100% of the independent control signal 411 from manual control submodule 403 (step 1107). If not, thereafter, the target velocity is determined (step 1109) and if the target velocity is greater than the positional system's maximum refresh rate zone (e.g., resulting in unsafe velocity), the user is alerted and the active control submodule 407 outputs a summed control signal 409 including 100% of the independent control signal 411 from manual control submodule 403 (step 1107). If not, thereafter, the target position delta between subsequent readings is determined (step 1111) and if the target position delta between subsequent reading is greater than the allowed change window threshold, the user is alerted and the active control submodule 407 outputs a summed control signal 409 including 100% of the independent control signal 411 from manual control submodule 403 (step 1107). If not, thereafter, the target position confidence is determined (step 1113) and if the target position confidence rating from the encoding system (e.g., sensors 325) is less than 40%, the user is alerted and the active control submodule 407 outputs a summed control signal 409 including 100% of the independent control signal 411 from manual control submodule (step 1107). If not, the active control submodule 407 outputs a summed control signal 409 including 100% of the independent control signal 411 from reactive control submodule 405 (step 1115). The invention is not limited to the control scheme shown and described in FIG. 11, which is merely an example of a potential control scheme for active control submodule 107. Other criteria and other inputs may be provided to determine which controls may be scaled in the active control submodule 407.

Figure 12:
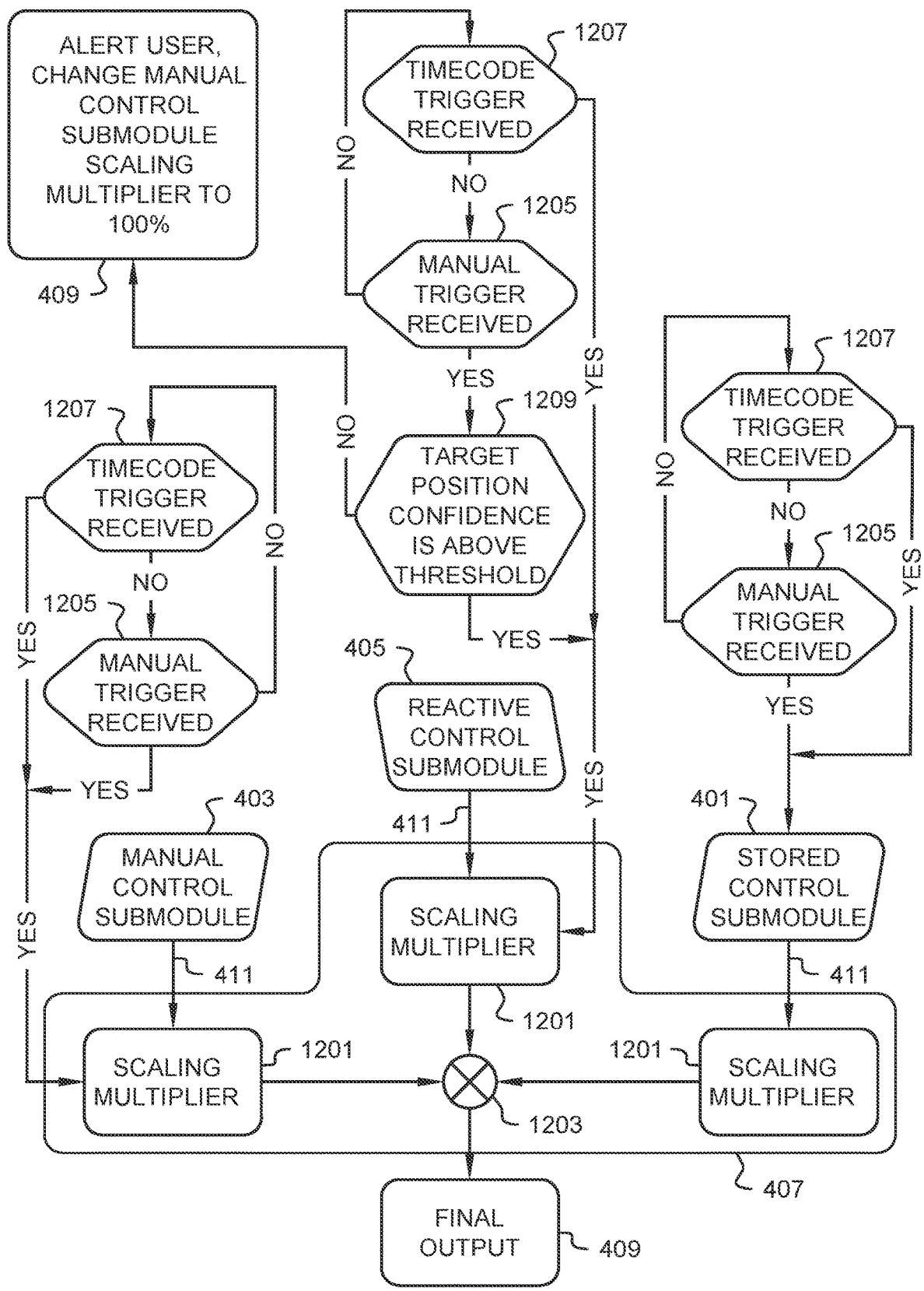
FIG. 12 shows a process flow showing an exemplary summing methodology for determining the summed control signal according to an embodiment of the present disclosure.

FIG. 12 shows a process flow showing an exemplary summing methodology for determining the summed control signal 409 according to an embodiment of the present disclosure. As shown in FIG. 12, the stored control submodule 401, the manual control submodule 403 and the reactive control submodule 405 are shown providing an independent control 411 to the active control submodule 407. The active control submodule 407 includes scaling multipliers 1201, which includes values that determine the scale, weight or dominance the independent control signal 411 from each of the stored control submodule 401, the manual control submodule 403 and the reactive control submodule 405. The active control submodule 407 combines the scaled independent control signals 411 in a summation device 1203 that outputs the summed control signal 409. The summed control signal 409 include a control signal that is capable of providing desired control to a device 105. In order to provide the independent control signal 409, each of the stored control submodule 401, the manual control submodule 403 and the reactive control submodule 405 each include a manual trigger 1205 and a timecode trigger 1207. The manual trigger 1205 includes sensing a manual signal, such as a signal from an operator that activates a signal from the corresponding submodule. The timecode trigger 1207 actives the corresponding submodule at a predetermined time, which may be individually set at each of the timecode triggers 1207. In addition to the manual trigger 1205 and the timecode trigger 1207, other triggers or decisions may be included. As shown in FIG. 12, a decision 1209 is provided that determines the target position and if the position is above a predetermined threshold, the user is alerted and the active control submodule 407 scales the reactive control submodule 405 to 100% at the scaling multiplier 1201 of the active control submodule 407 corresponding to the reactive control submodule 405. The invention is not limited to the functionality shown and described in FIG. 12, which is merely an example of a potential control scheme for active control submodule 107. Other criteria and other inputs may be provided to determine which controls may be scaled in the active control submodule 407.

The present application contemplates methods, systems and program products on any machine-readable media for accomplishing its operations. The embodiments of the present application may be implemented using an existing computer processor, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general-purpose computer, special purpose computer, or special purpose processing machine to perform a certain function or group of functions. Software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An automation and motion control system to control a plurality of theatrical objects, the control system comprising:
  a plurality of nodes and an operator console node in communication with each other over a real time network, the node corresponding to a device for control of a theatrical object;
  each node of the plurality of nodes and the operator console node comprising a microprocessor and a memory device, the operator console node further comprising a stored control path submodule, a manual control submodule and a reactive control submodule, each of the stored control path submodule, the manual control submodule and the reactive control submodule generating an independent control signal; and
  an active control submodule generating a summed control signal in response to the independent control signals from the stored control path submodule, the manual control submodule and the reactive control submodule, the summed control signal being provided to a node process, providing control to the at least one device.

2. The automation and control system of claim 1, wherein the stored control path submodule provides a control signal corresponding to a predetermined motion path to the device.

3. The automation and control system of claim 1, wherein the manual control submodule provides a control signal corresponding to a manually directed motion path to the device.

4. The automation and control system of claim 1, wherein the reactive control submodule provides a control signal corresponding to an automatically directed motion path to the device.

5. The automation and control system of claim 1, further comprises one or more sensors for providing position data for the device.

6. The automation and control system of claim 5, wherein the sensor provides real-time position data to one or more of the stored control path submodule, the manual control submodule and the reactive control submodule.

7. The automation and control system of claim 6, wherein the one or more sensors further determines a condition of the device.

8. The automation and control system of claim 7, wherein the conditions include one more of position, velocity and acceleration.

9. The automation and motion control system of claim 1, wherein the device corresponds to one or more of a machinery component, an input/output device, an external system, a safety system, a remote station and an operator console.

10. The automation and control system of claim 1, wherein the device corresponds to one or more of a winch, a lift, a motor, a pneumatic/hydraulic cylinder, a linear actuator, a trolley, a dolly, a cane, a jib, a boom, and a gimbal.

11. The automation and control system of claim 1, wherein the operator console node further comprises a condition submodule, the condition submodule providing a control signal corresponding to a condition or special effect of the device.

12. A method to control a plurality of theatrical objects, the method comprising:
  providing a plurality of nodes and an operator console node in communication with each other over a real time network, each node of the plurality of nodes corresponds to at least one device for control of a theatrical object, each node of the plurality of nodes and the operator console node comprising a microprocessor and a memory device, the operator console node further comprising a stored control path submodule, a manual control submodule and a reactive control submodule,
  generating independent control signals with each of the stored control path submodule, the manual control submodule and the reactive control submodule;
  generating a summed control signal in response to the independent control signals from the stored control path submodule, the manual control submodule and the reactive control submodule;
  providing the summed control signal to a node process; and
  controlling the at least one device with the summed control signal.

13. The method of claim 12, wherein the stored control path submodule provides a control signal corresponding to a predetermined motion path to the device.

14. The method of claim 12, wherein the manual control submodule provides a control signal corresponding to a manually directed motion path to the device.

15. The method of claim 12, wherein the reactive control submodule provides a control signal corresponding to an automatically directed motion path to the device.

16. The method of claim 12, further comprises one or more sensors for providing position data for the device.

17. The method of claim 16, wherein the one or more sensors provides real-time position data to one or more of the stored control path submodule, the manual control submodule and the reactive control submodule.

18. The method of claim 17, wherein the one or more sensors further determines a condition of the device.

19. The method of claim 12, wherein the conditions include one more of position, velocity and acceleration.

20. The method of claim 12, wherein the device corresponds to one or more of a machinery component, an input/output device, an external system, a safety system, a remote station and an operator console.

21. The method of claim 12, wherein the device corresponds to one or more of a winch, a lift, a motor, a pneumatic/hydraulic cylinder, a linear actuator, a trolley, a dolly, a cane, a jib, a boom, and a gimbal.

22. The method of claim 12, wherein the operator console node further comprises a condition submodule, the condition submodule providing a control signal corresponding to a condition or special effect of the device.

\* \* \* \* \*